United States Patent
Letourmy et al.

(10) Patent No.: US 12,054,416 B2
(45) Date of Patent: Aug. 6, 2024

(54) PRODUCT BASED ON MINERAL FIBERS AND PROCESS FOR OBTAINING IT

(71) Applicant: SAINT-GOBAIN ISOVER, Courbevoie (FR)

(72) Inventors: Arnaud Letourmy, Margny les Compiegne (FR); Eric Mangematin, Cires les Mello (FR); Patrice Martins, Lamorlaye (FR)

(73) Assignee: SAINT-GOBAIN ISOVER, Courbevoie (FR)

( * ) Notice: Subject to any disclaimer, the term of this patent is extended or adjusted under 35 U.S.C. 154(b) by 463 days.

(21) Appl. No.: 17/382,475

(22) Filed: Jul. 22, 2021

(65) Prior Publication Data

US 2021/0347677 A1 Nov. 11, 2021

Related U.S. Application Data

(60) Division of application No. 16/382,928, filed on Apr. 12, 2019, which is a continuation of application No. 12/919,975, filed as application No. PCT/FR2009/050326 on Feb. 27, 2009, now abandoned.

(30) Foreign Application Priority Data

Feb. 28, 2008 (FR) ...................................... 0851281

(51) Int. Cl.
| | |
|---|---|
| *C03B 37/04* | (2006.01) |
| *D04H 1/4209* | (2012.01) |
| *D04H 1/4218* | (2012.01) |
| *D04H 1/4226* | (2012.01) |

(Continued)

(52) U.S. Cl.
CPC ............ *C03B 37/048* (2013.01); *C03B 37/04* (2013.01); *C03B 37/045* (2013.01); *D04H 1/4209* (2013.01); *D04H 1/4218* (2013.01); *D04H 1/4226* (2013.01); *D04H 1/4374* (2013.01);

(Continued)

(58) Field of Classification Search
None
See application file for complete search history.

(56) References Cited

U.S. PATENT DOCUMENTS

| | | | |
|---|---|---|---|
| 3,009,600 | A | 11/1961 | Matsch |
| 4,537,820 | A | 8/1985 | Nowobilski et al. |

(Continued)

FOREIGN PATENT DOCUMENTS

| | | |
|---|---|---|
| EP | 0091381 | 10/1983 |
| FR | 2529878 | 1/1984 |
| FR | 2576671 | 8/1986 |

OTHER PUBLICATIONS

International Search Report issued Aug. 12, 2009 in PCT/FR2009/050326, 4 pages.

*Primary Examiner* — Lisa L Herring
(74) *Attorney, Agent, or Firm* — Element IP, PLC

(57) ABSTRACT

A thermal insulation product based on mineral wool, characterized in that the fibers have a micronaire of less than 10 l/min, preferably less than 7 l/min and especially between 3 and 6 l/min, and in that the material has a thermal conductivity of less than 31 mW/m·K, especially less than 30 mW/m·K. The parameters for obtaining this product are in particular the pressure of the burner, the rotation speed of the fiberizing spinner and the daily fiber output per spinner orifice.

8 Claims, 2 Drawing Sheets

(51) Int. Cl.
*D04H 1/4374* (2012.01)
*D04H 1/74* (2006.01)
(52) U.S. Cl.
CPC ...... *D04H 1/74* (2013.01); *Y10T 428/249921* (2015.04)

(56) References Cited

U.S. PATENT DOCUMENTS

| | | |
|---|---|---|
| 4,661,135 A | 4/1987 | Mosnier |
| 4,759,974 A * | 7/1988 | Barthe .................... C03C 13/00 428/920 |
| 4,889,546 A | 12/1989 | Denniston |
| 5,041,178 A * | 8/1991 | Kielmeyer ........... D04H 1/4218 264/108 |
| 5,277,706 A | 1/1994 | Blandin et al. |
| 5,671,518 A | 9/1997 | Kummermehr et al. |
| 2003/0040239 A1 | 2/2003 | Toas et al. |
| 2004/0161993 A1 | 8/2004 | Tripp et al. |
| 2005/0085369 A1 | 4/2005 | Jensen |
| 2005/0112093 A1 * | 5/2005 | Ette .................... A61K 31/7056 424/85.4 |
| 2006/0078720 A1 | 4/2006 | Toas et al. |
| 2006/0281622 A1 | 12/2006 | Maricourt et al. |

* cited by examiner

PRODUCT BASED ON MINERAL FIBERS AND PROCESS FOR OBTAINING IT

This application is a Divisional of U.S. application Ser. No. 16/382,928 filed Apr. 12, 2019, which is a Continuation of U.S. application Ser. No. 12/919,975 filed Dec. 7, 2010, which is a National Stage of PCT/FR2009/050326 filed Feb. 27, 2009 and claims the benefit of FR 0851281 filed Feb. 28, 2008.

The invention relates to products based on mineral wool, such as glass wool, intended especially for making up thermal and possibly acoustic insulation products, more particularly for the lining of walls and/or roofs.

BACKGROUND OF THE INVENTION

In the insulation market, suppliers always wish to provide products of ever greater performance in terms of thermal insulation. The thermal performance of a product is generally obtained by knowing the thermal conductivity $\lambda$. It will be recalled that the thermal conductivity $\lambda$ of a product is the capacity of the product to let through a heat flux: $\lambda$ is expressed in W/m·K. The lower this conductivity, the more insulating the product, and therefore the better the thermal insulation.

Commercially available products based on mineral fibers, which are made of rock wool or glass wool, have a thermal conductivity between 0.040 and 0.035 W/m·K, or at best 0.032 W/m·K. Unless otherwise specified, the thermal conductivity is that measured conventionally at 10° C. according to the ISO 8301 Standard.

Other approaches enable a thermal conductivity of 0.032 W/m·K, or even 0.031 W/m·K, to be obtained, but these involve completely different products, such as those based on special expanded polystyrenes. However, the invention lies solely within the field of products based on mineral fibers.

Products based on mineral wool, particularly glass wool, are obtained by a known internal centrifugation process combined with attenuation by a high-temperature gas stream.

This fiber-forming process consists in introducing a molten glass stream into a spinner, also called a fiberizing dish, rotating at high speed and pierced around its periphery by a very large number of orifices through which the glass is ejected in the form of filaments owing to the effect of the centrifugal force. These filaments are then subjected to the action of an annular high-velocity high-temperature attenuating gas stream produced by a burner and hugging the wall of the spinner, which gas stream attenuates said filaments and converts them to fibers. The fibers formed are entrained by this attenuating gas stream to a receiving device, generally consisting of a gas-permeable belt which is combined with suction means. A binder needed to bind the fibers into a wool product is sprayed onto the fibers while they are being drawn to the receiving device. The accumulation of fibers on the receiving device under the effect of the suction provides a fiber mat, the thickness of which may vary depending on the final product to be obtained.

This process for converting glass into fibers is extremely complex and requires a large number of variable parameters to be balanced. In particular, the pressure of the burner and the velocity of the attenuating gas play an important role in fiber refining optimization. The design of the fiberizing spinner is also an important factor.

In general, the fibers obtained by internal centrifugation have an average diameter of 3 µm, which corresponds to a micronaire of 3 under 5 grams, or else an average diameter of 2 µm, which corresponds to a micronaire of 2.8 under 5 grams.

It will be recalled that the fineness of fibers is determined by the value of their micronaire (F) under 5 g. The micronaire measurement, also called "fineness index" measurement, takes into account the specific surface area by measuring the aerodynamic pressure drop when a given quantity of fibers extracted from an unsized blanket is subjected to a given pressure of a gas, in general air or nitrogen. This measurement is standard practice in mineral fiber production units, is carried out according to the DIN 53941 or ASTM D 1448 Standard and uses what is called a "micronaire apparatus".

However, such an apparatus has a measurement limit as regards a certain fiber fineness. For very fine fibers, the fineness (micronaire) may be measured in l/min using a known technique described in patent application WO 2003/098209. This patent application specifically relates to a device for determining the fineness index of fibers and comprises a device for measuring the fineness index, said fineness index measurement device being provided, on the one hand, with at least a first orifice connected to a measurement cell designed to receive a specimen consisting of a plurality of fibers and, on the other hand, with a second orifice connected to a device for measuring the differential pressure on either side of said specimen, said differential pressure measurement device being intended to be connected to a fluid flow production device, characterized in that the fineness index measurement device includes at least one volume flow meter for measuring the volume of fluid passing through said cell. This device provides correspondences between micronaire values and liters per minute (l/min).

By way of indication, according to the document WO 2003/098209, a correspondence relationship between micronaire value and average diameter of the fiber specimen may be noted. In general, a micronaire value of about 12 l/min corresponds to an average diameter of 2.5 to 3 µm, a 13.5 l/min value corresponds approximately to an average diameter of 3 to 3.5 µm, and finally an 18 l/min value corresponds to an average diameter of about 4 to 5 µm.

Fine fibers with an average diameter of about 3 µm have been produced for certain applications.

In particular, to obtain glass webs a few millimeters in thickness for the purpose of producing aerosol filters or battery separators, document WO 99/65835 provides an internal centrifugation device which thus permits fibers with a diameter of about 3 µm to be obtained. The device of the above document comprises a spinner provided with orifices arranged in rows, at least two adjacent rows having orifices of different diameters and the height over which fibers are formed by the spinner is equal to or less than 35 mm. However, this type of application for filters, which also uses very thin products, is very far from the application to thermally insulating products and in no way makes reference to the concept of thermal conductivity.

For another application, for the purpose of producing insulation products, document EP 1 370 496 discloses an internal centrifugation device that delivers fine fibers, the average diameter of which is not greater than 3.5 microns, with 2.1 µm as the smallest diameter obtained.

For this purpose, the burner of the above device has certain specific features in combination with a particular configuration of the spinner. The spinner thus comprises at least two annular zones, the number of orifices per unit area of which differs by an amount of 5% or more, the distance between the centers of the closest neighboring orifices of a given annular zone being approximately constant over the entire given annular zone, and this distance varying from one zone to another by at least 3%, decreasing in the centrifugation position of the spinner from the top downward.

Such a device, which generates finer fibers, improves the thermal conductivity of the products obtained for a density equivalent to that of the usual products. The example given in the above document is a product with a thickness of 80 mm providing, at low density (9 kg/m$^3$), quite a good conductivity (41.2 W/m·K).

However, it is always desirable to improve the thermal conductivity of a product so as to achieve a satisfactory insulation performance without correspondingly using an excessively high thickness. This is because, depending on the thermal conductivity of the material constituting the product, the thickness of the product must be adapted in order to provide a highest possible performance, expressed by a thermal resistance (denoted by R).

It is clear that with the product disclosed in the above document EP 1 370 496, the wish to increase the thermal resistance necessitates increasing the thickness of the product significantly, something which would not be compatible with certain building insulation applications.

BRIEF SUMMARY OF THE INVENTION

The object of the invention is therefore to provide a thermal insulation product based on mineral fibers that has improved thermal insulation properties so that it can be used in reasonable thicknesses for the building application to which this product is intended.

DETAILED DESCRIPTION OF THE INVENTION

According to the invention, the thermal insulation product based on mineral wool is characterized in that the fibers have a micronaire of less than 10 l/min, in particular at most 9 l/min, preferably less than 7 l/min and especially between 3 and 6 l/min, and in that the product has a thermal conductivity of less than 31 mW/m·K and preferably less than 30 mW/m·K.

The product is thus characterized by an average fiber diameter of less than 2 µm or even less than 1 µm.

According to the invention, it turns out that, for a specific thermal insulation application, a product containing even finer fibers than in the prior art can be successfully manufactured with a structure such that the product is characterized by an even better thermal conductivity than in the prior art. The product of the invention incontestably enables better thermal insulation performance to be achieved and, because of the fineness of its fibers, is also a softer product which is pleasant to handle.

According to one feature, the density of the product is at least 30 kg/m$^3$, preferably between 35 and 60 kg/m$^3$, and in particular between 40 and 55 kg/m$^3$.

Advantageously, the fibers are essentially, especially in a proportion of at least 75%, approximately parallel to the long dimensions of the product, which is substantially of rectangular parallelepipedal shape. The term "approximately parallel" is understood to mean a parallelism to within plus or minus 30° with respect to the planes forming the long dimensions of the product. This parallel arrangement of fibers thus resists the transmission of heat through the thickness of the product (perpendicular to said planes). The proportion of fibers oriented along the thickness of the product (perpendicular to the long dimensions) is minimized, with the result that heat transmission via the air passages in the form of fibers chimneys lying between these fibers is prevented.

The structure is essentially a mineral wool structure composed of fibers, particularly glass fibers, bound together by a binder, in proportions of 5 to 8% by weight of the product.

It is desirable, in view of the application of the product, to add standard additives of the oily type, in order to pick up dust, of the antistatic type or of the water-repellent type, such as silicone.

According to another feature, the thickness of the product is at least 30 mm, especially from 40 to 150 mm, depending on the intended application and the desired thermal resistance.

To obtain a product of suitable thickness, the product may take the form of a cut panel, optionally composed of several layers.

The product is used more particularly for the lining of walls and/or roofs in the building industry.

This thermally insulating product may also be integrated into an acoustic insulation system.

Preferably, the product is based on glass fibers, the proportion of unfiberized material not exceeding 1% in order to limit heat transfer even better.

The product of the invention is preferably obtained by an internal centrifugation fiberizing process, using a fiberizing installation having fiberizing parameters adapted so as to provide fibers with the desired fineness index.

According to the invention, the mineral wool manufacturing process employs an installation that comprises an internal centrifugation device that comprises a spinner capable of rotating about an axis X, especially a vertical axis, and the peripheral band of which is drilled with a plurality of orifices for delivering filaments of a molten material, a high-temperature gas attenuating means in the form of an annular burner, which attenuates the filaments into fibers, and a receiving belt associated with suction means for receiving the fibers, and is characterized in that said process consists in controlling a combination of parameters, these being, at least, the pressure of the burner between 450 and 750 mmWC (water column), the rotation of the spinner at a speed greater than 2000 revolutions/minute and the daily fiber output per spinner orifice, which is at most 0.5 kg and preferably at most 0.4 kg.

For a given spinner configuration according to the invention, the pressure of the burner is thus 500 mmWC and at most 750 mmWC, so as for example to generate fibers with a micronaire of 5.5 l/min and 3.4 l/min respectively. These pressure values do not cause excessive turbulence, allow the fiber layers to be stacked uniformly on the receiving belt and deliver fiber which is highly advantageously slightly longer.

According to one feature, the process of the invention is such that the throughput of molten material entering the spinner is less than 18 tonnes/day for a spinner having at least 32 000 orifices, and preferably in a combination of throughput of at most 14 tonnes/day and of a spinner with at least 36 000 orifices.

Spinners with a diameter of 600 mm generally do not have more than 32 000 orifices. In contrast, the invention provides a spinner having substantially more orifices than in the prior art, by increasing the number of orifices per unit area.

The diameter of the spinner is a diameter of between 200 and 800 mm, the fiber output per orifice being adapted to the diameter of the spinner.

The height of the perforation band of the spinner preferably does not exceed 35 mm.

The spinner contains two or more annular zones superposed one above the other, the spinner orifices having, from one zone to another, rows of orifices of different diameter, and the diameter per annular row decreasing, in the centrifugation position, from the top of the peripheral band of the spinner toward the bottom. The diameter of the orifices is between 0.5 and 1.1 mm.

According to yet another feature, the distance between the centers of neighboring orifices in the same annular zone may or may not be constant throughout an annular zone, and this distance varies from one zone to another by at least 3% or even by at least 10%, and, in the centrifugation position, decreases from the top of the peripheral band of the spinner toward the bottom, with in particular a distance between 0.8 mm and 2 mm.

The process of the invention thus provides, by the adjustments, essentially in the pressure of the burner, in the rotation speed of the spinner and, unexpectedly, in the daily output of molten material per spinner orifice, a product composed of fibers that are particularly fine, with a micronaire of less than 10 l/min, and, for more than 65% of the fibers, with an average diameter of less than 1 µm, accompanied by a thermal conductivity of less than 31 mW/m·K, even less than 30 mW/m·K, something not offered by the prior art.

Furthermore, to contribute to the consequent lowering of the thermal conductivity, the process of the invention provides the flattest possible arrangement of fibers, i.e. in a fiber arrangement parallel to the long dimensions of the product.

This arrangement is in particular obtained by characteristics relating to the receiving of the fibers and to the removal thereof by the conveyor that extends the receiving belt. For this purpose, the process of the invention consists in regulating the run speed of a conveyor butted onto the receiving belt which is greater than the run speed of said receiving belt, in particular by more than 10% and preferably by at least 15%.

BRIEF DESCRIPTION OF THE DRAWINGS

Other advantages and features of the invention will now be described in greater detail with regard to the appended drawings in which:

FIG. 1 shows schematically a cross-sectional view in a vertical plane of an installation 1 for forming a mineral wool blanket.

Figure 1:
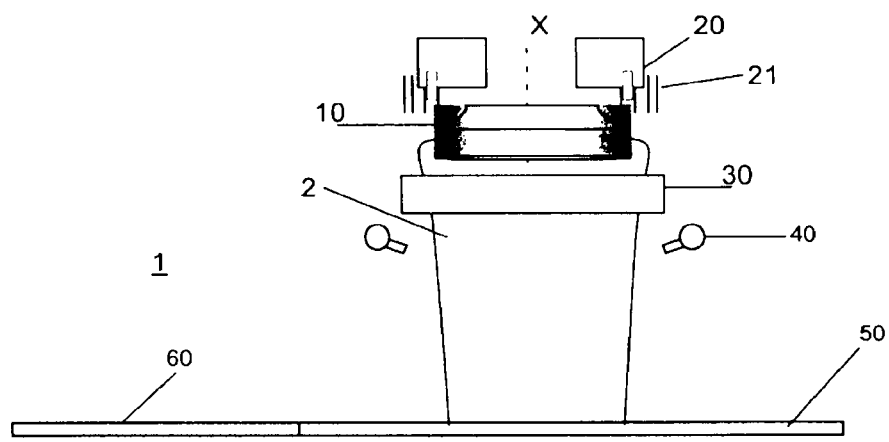
FIG. 1 illustrates a schematic vertical cross-sectional view of a fiberizing installation according to the invention.

The installation 1 comprises, in a known manner from upstream to downstream, or from the top down, along the direction of flow of the attenuable material in the molten state, an internal centrifugation device 10 that delivers filaments of an attenuable material, an attenuation device 20 delivering a gas stream that converts the filaments into fibers, which fall in the form of a web 2, an annular inductor 30 placed beneath the centrifugation device 10, a binder supply device 40, and a belt 50 for receiving the fibers, on which the fibers accumulate so as to form the blanket. The blanket is then conveyed to an oven in order to cure the fibers and the binder by means of a conveyor belt that extends the receiving belt 50 in the same plane.

Figure 2:
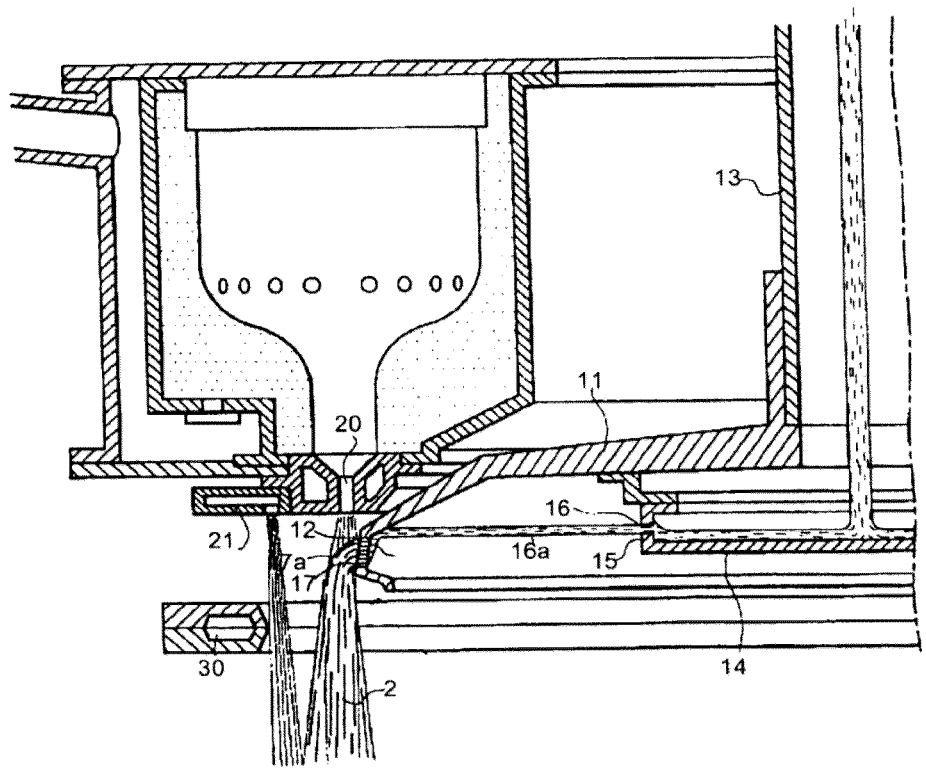
FIG. 2 illustrates a schematic vertical cross-sectional view of the fiberizing device of the installation.
Figure 3:
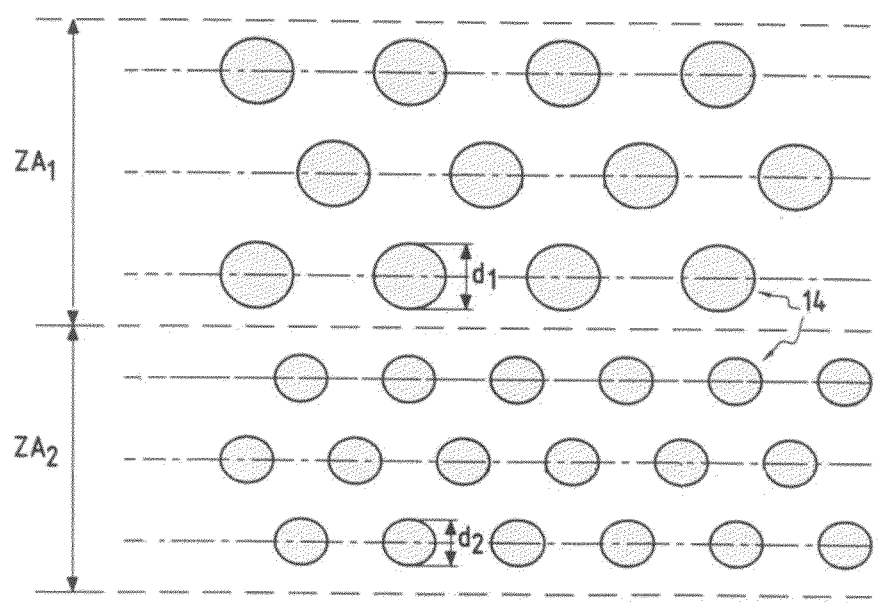
FIG. 3 illustrates a spinner containing plural annular zones $ZA_1$ and $ZA_2$ superposed one above the other with spinner orifices 14 having, from one zone to another, rows of orifices of different diameter $d_1$ and $d_2$.

FIG. 2 illustrates the devices 10, 20 and 30 of the fiberizing installation in greater detail.

The centrifugation device 10 comprises a spinner 11, also called a fiberizing dish, rotating at high speed, having no bottom in its lower part, and pierced around its peripheral wall 12 by a very large number of orifices via which the molten material is ejected in the form of filaments owing to the centrifugal force.

The bottomless spinner 11 is fastened to a hub held on a vertically mounted hollow shaft 13 rotating about an axis X, the shaft being driven by a motor (not shown).

A basket 14 with a solid bottom is connected to the spinner, being placed inside the spinner, so that its opening faces the free end of the hollow shaft 13 and its wall 15 is substantially away from the peripheral wall or band 12.

The cylindrical wall 15 of the basket is perforated by a small number of relatively large orifices 16, for example having a diameter of around 3 mm.

A stream of molten glass feeds the spinner, passing through the hollow shaft 13 and flowing out into the basket 14. The molten glass, by passing through the basket orifices 16, is then delivered in the form of primary streams 16a directed toward the inside of the peripheral band 12, from where they are expelled in the form of filaments 17a through the spinner orifices 17 owing to the centrifugal force.

The attenuation device 20 consists of an annular burner that delivers a high-temperature high-velocity gas stream, said stream hugging the spinner wall 12. This burner serves to maintain the high temperature of the spinner wall and contributes to the attenuation of the filaments so as to convert them into fibers.

The attenuating gas stream is generally channeled by means of a surrounding cold gas sheath. This gas sheath is produced by a blowing ring 21 that surrounds the annular burner. Said cold gas sheath also helps to cool the fibers, the strength of which is thus improved by a thermal quenching effect.

The annular inductor 30 heats the underside of the centrifugation device so as to help to maintain the thermal equilibrium of the spinner 11.

The binder supply device 40 consists of a ring through which the web of fibers 2 flows. The ring includes a multiplicity of nozzles that spray the web of fibers with binder. Usually, the binder that helps to provide mutual cohesion of the fibers includes anti-dust agents, of the oily type, and antistatic agents.

The mineral material that is converted into fiber is preferably glass.

Any type of glass convertible by the internal centrifugation process may be suitable.

It may for example preferably be a lime-borosilicate glass containing significant amounts of boron.

According to the invention, fine fibers are obtained by regulating various parameters, in particular:
  the pressure of the burner 20;
  the rotation speed of the spinner 11; and
  the daily output of fibers delivered by each spinner orifice 17.

The annular burner 20 is of standard design. The temperature of the gas jet at its outlet is between 1350 and 1500° C., preferably around 1400° C.

According to the invention, the pressure of the burner is set between 450 and 750 mmWC (it will be recalled that 1 mmWC=9.81 Pa) so as to generate an attenuating gas jet best suited to the desired fiber fineness, in combination with the other aforementioned parameters. Although usually the pressure of a burner is 500 mmWC, it is possible according to the invention to choose to increase the pressure so as to make thinner fibers. However, this requires more energy. There has to be a compromise between the various above-mentioned parameters in order to obtain the desired product depending on the economic and energy factors to be taken into account.

According to the invention, the rotation speed of the spinner is more rapid than the usual 1900 revolutions per minute (rpm). The spinner of the invention rotates at a speed of greater than 2000 rpm, for example 2200 rpm.

According to the invention, the fiber output per spinner orifice is at most 0.5 kg/day and preferably does not exceed 0.4 kg/day. The daily fiber output per orifice corresponds to the throughput of molten material passing through each orifice per day.

This output is of course dependent on the throughput of molten material delivered upstream of the spinner and on the number of orifices drilled in the spinner. According to the invention, the throughput of molten material does not exceed 19 tonnes per day (t/day) and preferably does not exceed 14 t/day. In comparison, the usual output of a furnace delivering molten glass is generally around 23 to 25 tonnes per day. The spinner itself has at least 32 000 orifices, preferably at least 36 000 orifices, and therefore a larger number than in a standard spinner, which is generally 31 846.

The spinner has a diameter of between 200 mm and 800 mm, the number of orifices and the output of molten material delivered being adapted accordingly. The fiber output delivered by a spinner will be lower the smaller the diameter of the spinner. The diameter is preferably 600 mm.

The spinner contains two or more annular zones super-posed one above the other, each zone being provided with one or more annular rows of orifices. Certain particular features relating to the spinner can also help to obtain fine fibers.

The perforated band height of the spinner—the height over which the orifices are spread—does not exceed 35 mm.

The spinner orifices have, from one zone to another, rows of orifices with different diameters, and the diameter per annular row decreasing, in the centrifugation position, from the top of the peripheral band of the spinner downward. The diameter of the orifices is between 0.5 and 1.1 mm.

The distance between the centers of neighboring orifices in the same annular zone is essentially constant throughout an annular zone, this distance varying from one zone to another by at least 3%, or even at least 10%, and decreasing, in the centrifugation position, from the top of the peripheral band of the spinner downward, in particular with a distance of between 0.8 mm and 2 mm.

According to the invention, the metered amount of binder delivered by the ring 40 is advantageously between 5 and 8% and preferably between 5 and 7%. The amount of binder customarily necessary in the usual products and in proportions of 8%, or higher, is here replaced by the amount of fiber; the product thus has a higher weight of fiber, leading to an increase in the thermal conductivity $\lambda$.

Finally, the lowering of the thermal conductivity $\lambda$ is also dependent on the arrangement of the fibers in the blanket. More than 75%, or even more than 85%, of the fibers are arranged so as to be approximately parallel to the long dimensions of the product. For this purpose, the run speed of the conveyor belt 60 is, according to the invention, faster than the speed of the receiving belt 50 by more than 10% and preferably by at least 15%.

This change in speed with acceleration makes the fibers lie as flat as possible in the run plane of the belts, being therefore oriented substantially parallel to the longest dimensions of the fiber blanket obtained, i.e. horizontally to the plane of the belts to within plus or minus 30°.

An example of a product according to the invention obtained in accordance with the method of the invention is presented below.

The installation comprised a fiberizing spinner 600 mm in diameter with 36 000 orifices, having an arrangement of orifices and diameter of the orifices as described above.

The daily output per orifice was 0.4 kg.

The rotation speed of the spinner was 2200 rpm.

The pressure of the burner was 500 mmWC.

The speed of the conveyor 60 was 15% higher than that of the receiving belt.

The product obtained had the following characteristics:
a fiber fineness index of 5.5 l/min;
more than 65% of the fibers had an average diameter of less than 1 µm;
a thermal conductivity of 29.6 mW/m·K, measured at 10° C. according to the ISO 8301 Standard;
a density of 45 kg/m³;
a binder content of 5% by weight of the product;
a thickness of 45 mm; and
more than 80% of the fibers were substantially parallel to the long dimensions.

The orientation of the fibers was determined in the following manner: several (especially at least six) parallelepipedal specimens, of the same size and with the same thickness as the product, were removed from said product. They were cut by means of a cutting instrument, such as a blade producing a sharp cut without dragging fibers in the cutting direction, thus not disturbing the fiber arrangement forming the product before cutting. Each specimen was observed edge-on, the observed surface was divided into small unitary areas, the fibers being detected visually in each unit area, the angle made between the fiber direction and a horizontal direction parallel to a long dimension of the product was recorded and the average angle in each of the areas was calculated. An image acquisition tool coupled to image processing software was used for this purpose. For each specimen, the fraction of fibers having an angle of orientation falling within a given angular sector was thus determined. The average of the data for each specimen was then averaged so as to express the orientation of the fibers in the product. In this example, it was found that 80% of the recorded angles lay within the 0°-30° and 150°-180° sectors (horizontal fibers), whereas 15% of the recorded angles lay within the 30°-60° and 120°-150° sectors (oblique fibers) and 5% of the recorded angles lay within the 60°-90° and 90°-120° sectors (vertical fibers).

Stable production of this product is obtained under conditions meeting the requirements of the EN 13162 Standard, the stated thermal conductivity value expressing the limit representing at least 90% of the production, determined with a 90% confidence level.

It is also possible to obtain a product with an even lower micronaire of 3.4 l/min with the burner pressure increased to 750 mmWC.

This product may be compared with a product obtained in a more standard fashion using the same 600 mm spinner, but one having 31 846 orifices and a daily fiber output per orifice of 0.7 kg, the burner pressure being 500 mmWC and the spinner rotation speed being 1900 rpm.

The comparative product produced had the following characteristics:
- a fiber fineness index of 2.8 under 5 g, which represents a value of greater than 10 l/min;
- an average fiber diameter of 2 µm;
- a thermal conductivity of 34 mW/m·K;
- a density of 50 kg/m³; and
- a thickness of 50 mm.

To provide a thicker product, for example with a thickness of 90 mm or more, thus giving a thermal resistance of 3 or more, the invention proposes to assemble at least two layers of the product that has just been described. This superposition of layers may be achieved before crosslinking the binder, by combining two plies between reception and the oven, especially between the conveyor belt 60 and the oven. Cohesion of the two plies is provided by the sharing of the uncrosslinked binder present at the interface between the two plies and by crosslinking the binder throughout the product in the oven.

Consequently, the configuration of the fiberizing installation according to several specific features, dependent most particularly on the rotation of the fiberizing spinner, on the burner and the fiber output, and additionally dependent on the receiving belt and on the conveyor following it, have made it possible, in a non-obvious manner, to obtain the thermal insulation product of the invention, which hitherto has not existed.

The product of the invention, because of its very fine fibers, offers the advantage of a softer feel, making it much less disagreeable to handle.

The product, through its considerably lowered thermal conductivity, provides even better thermal insulation and achieves an optimum thermal resistance for reasonable thicknesses.

Finally, the product of the invention, through its density preferably greater than 30 kg/m³, takes the form of relatively rigid sheets which furthermore, because of a standard thickness, can thus be easily handled and can be easily cut and positioned as required against the walls to be insulated. In addition, as may be seen in the case of the comparative example, it is possible to reduce the density of the product, the product therefore being lighter, to reduce its thickness and to achieve a better thermal conductivity.

The invention claimed is:

1. In an internal centrifugation fiberizing process for producing a thermal insulation product with an internal centrifugation device comprising (1) a spinner capable of rotating about an axis X which has its peripheral band drilled with a plurality of orifices for delivering filaments of a molten material, (2) a high-temperature gas attenuating unit in the form of an annular burner which attenuates the filaments into fibers, (3) a receiving belt for receiving the fibers, and (4) a conveyor for the fibers that extends the receiving belt;
the improvement wherein the conveyor conveys the fibers at a speed greater than a speed of the receiving belt by more than 15% and the process produces a thermal insulation product having at least 80% of its fibers aligned approximately parallel to longer dimensions of planes of the thermal insulation product, meaning a parallelism to within plus or minus 30° with respect to the planes formed by the longer dimensions of the product.

2. The improved internal centrifugation fiberizing process for producing a thermal insulation product according to claim 1, wherein the improvement additionally comprises maintaining a pressure of the annular burner between 450 and 750 mm WC, maintaining the rotation of the spinner at a speed greater than 2000 revolutions/minute, and maintaining a daily fiber output per spinner orifice at no more than 0.5 kg.

3. The improved internal centrifugation fiberizing process for producing a thermal insulation product according to claim 2, wherein said spinner has at least 32,000 orifices and the improvement additionally comprises maintaining a throughput of molten material entering the spinner at less than 18 tonnes/day.

4. The improved internal centrifugation fiberizing process for producing a thermal insulation product of claim 2, wherein the spinner has a diameter of between 200 and 800 mm.

5. The improved internal centrifugation fiberizing process for producing a thermal insulation product of claim 1, wherein the spinner has an orifice-perforated band height of at most 35 mm.

6. The improved internal centrifugation fiberizing process for producing a thermal insulation product of claim 1, wherein a diameter of the plurality of spinner orifices is between 0.5 and 1.1 mm.

7. The improved internal centrifugation fiberizing process for producing a thermal insulation product of claim 1, wherein the plurality of orifices of the spinner are distributed in several annular zones, with rows of orifices of different diameter in each annular zone, and with the diameter of the offices per annular row decreasing, in a centrifugal position, from a top of a peripheral band of the spinner toward a bottom of the spinner.

8. The improved internal centrifugation fiberizing process for producing a thermal insulation product of claim 7, wherein a distance between centers of neighboring orifices in each annular zone and a distance from one zone to another is varied by at least 3%, and in the centrifugal position, a distance between centers of the neighboring orifices in each annular zone decreases from the top of the peripheral band of the spinner toward the bottom of the spinner between 0.8 mm and 2 mm.

* * * * *